B. A. BROOKS.
TYPOGRAPHIC MACHINE.
APPLICATION FILED JUNE 20, 1906.
933,058.
Patented Sept. 7, 1909.
18 SHEETS—SHEET 6.
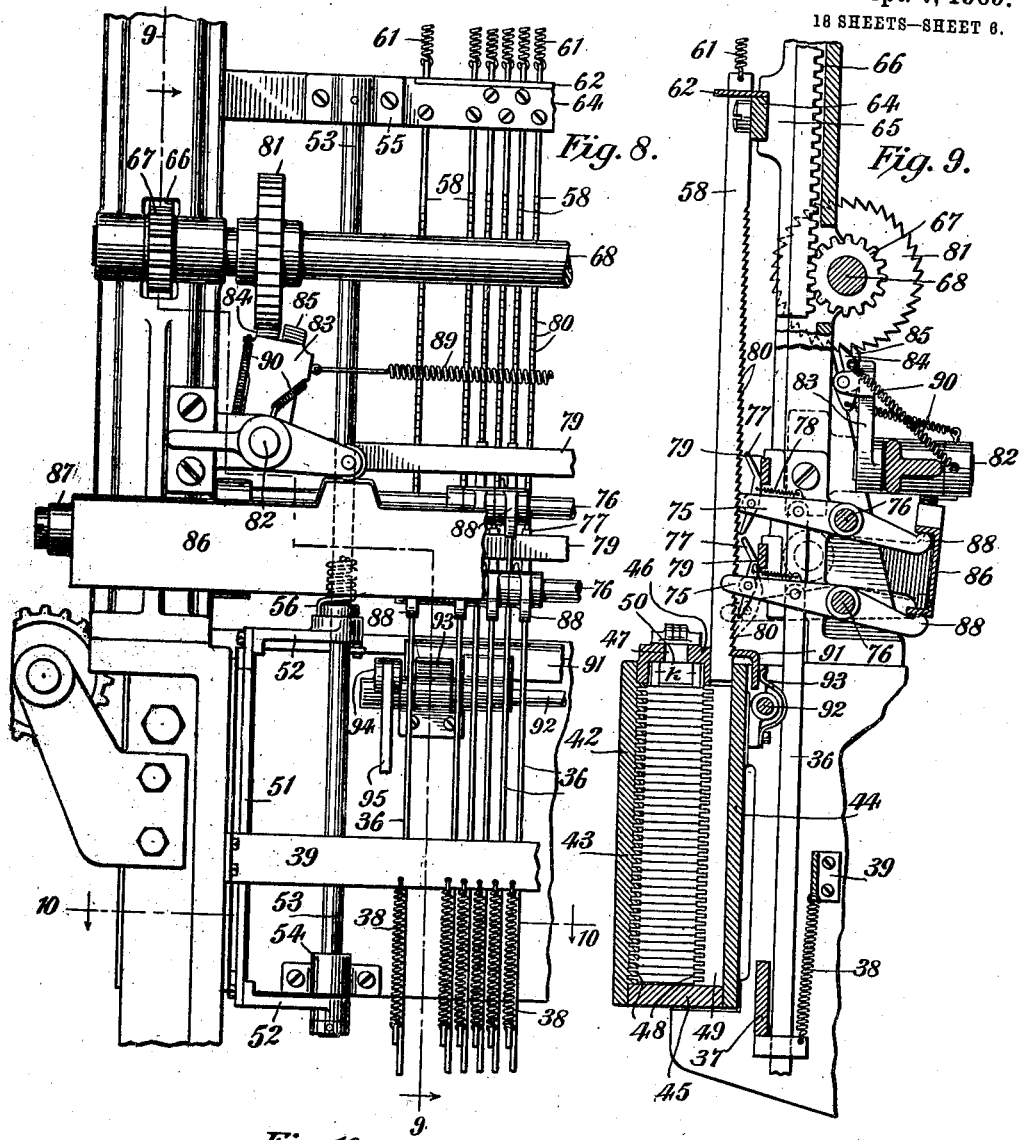
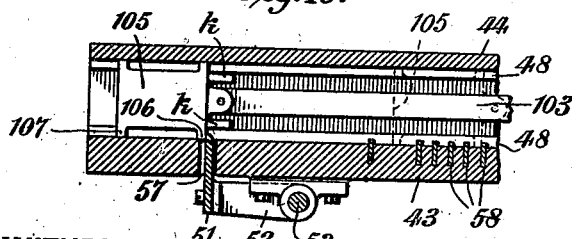
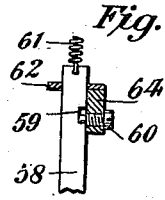
WITNESSES:
H. W. Hahn
C. E. Ashley
INVENTOR
Byron A. Brooks
By his Attorneys

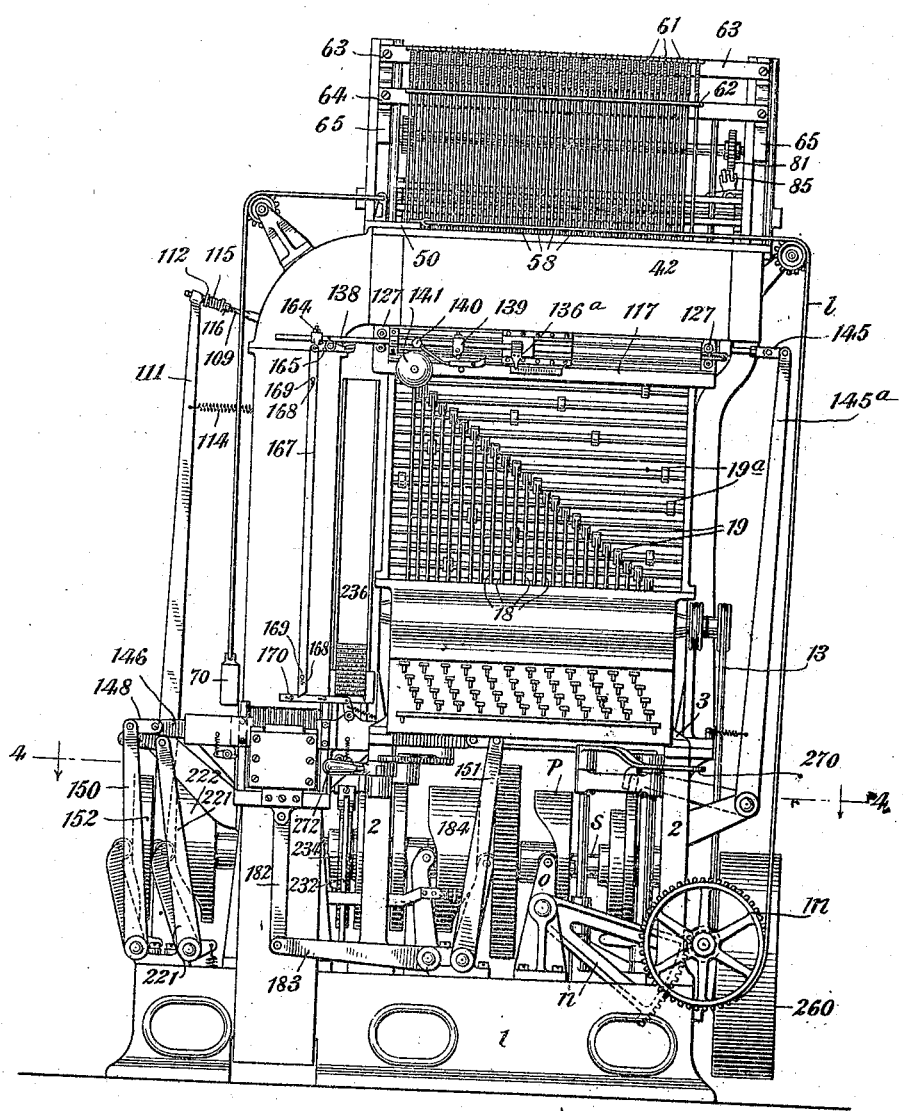

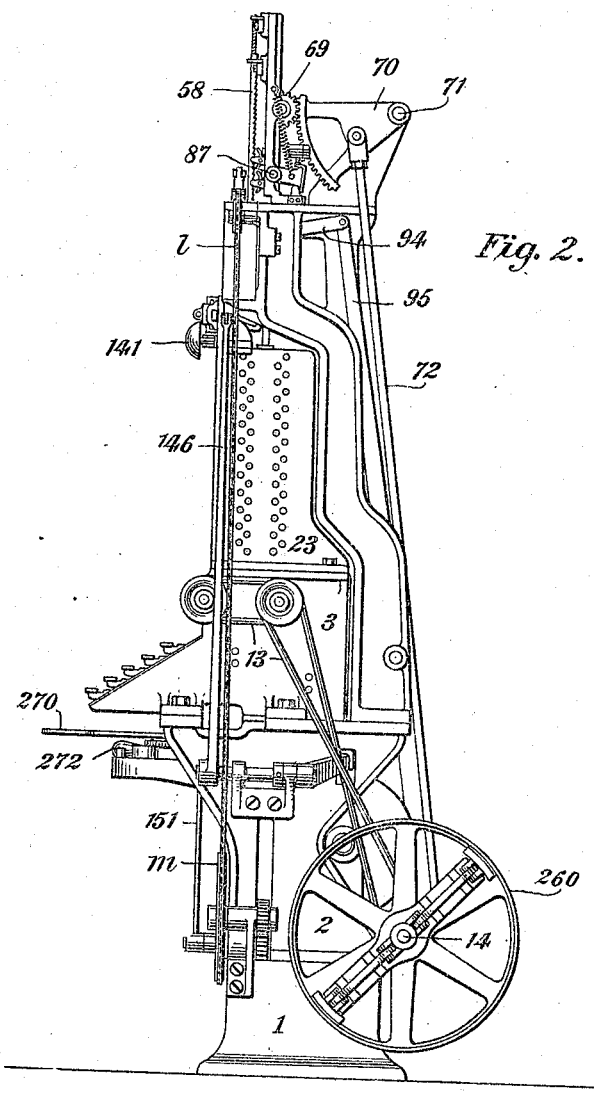

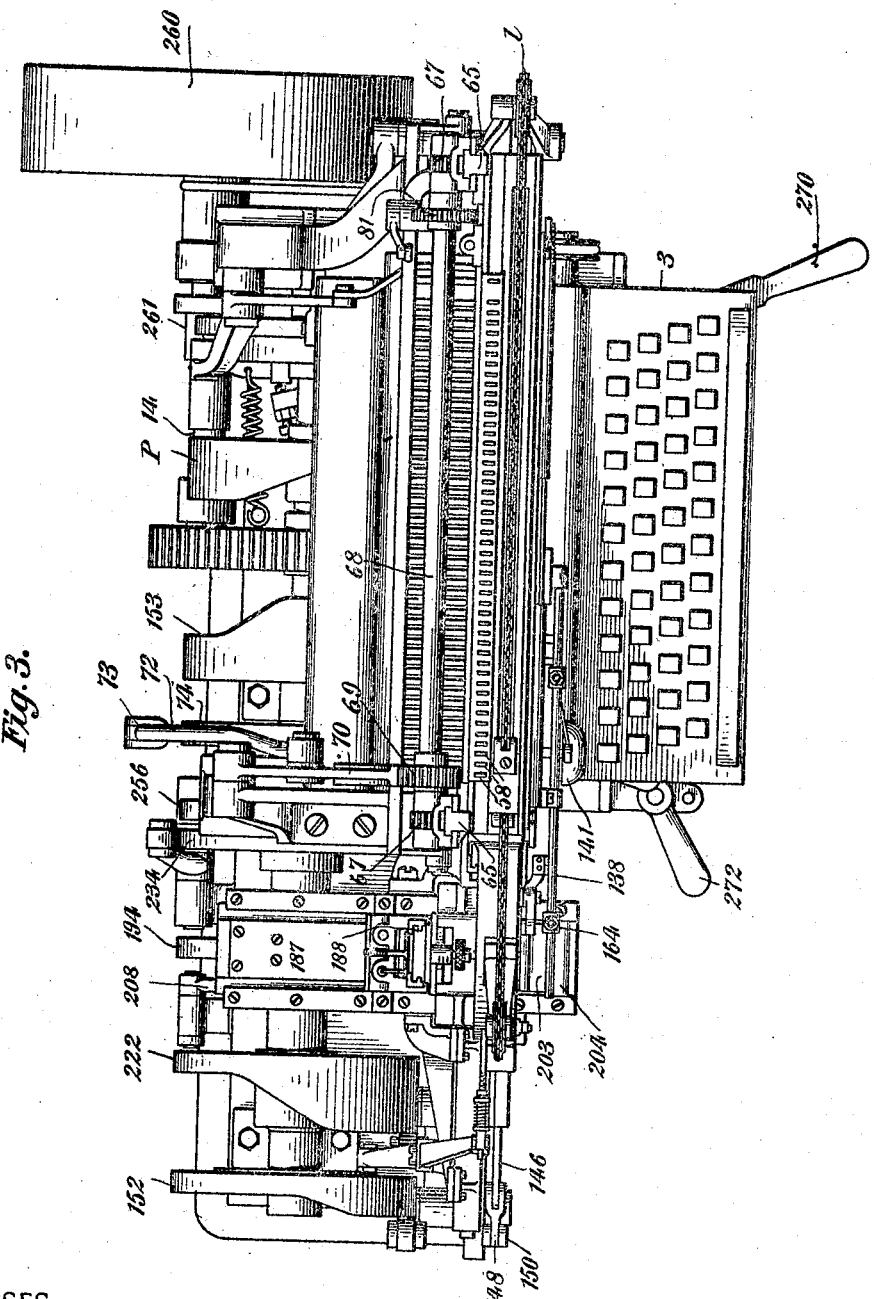

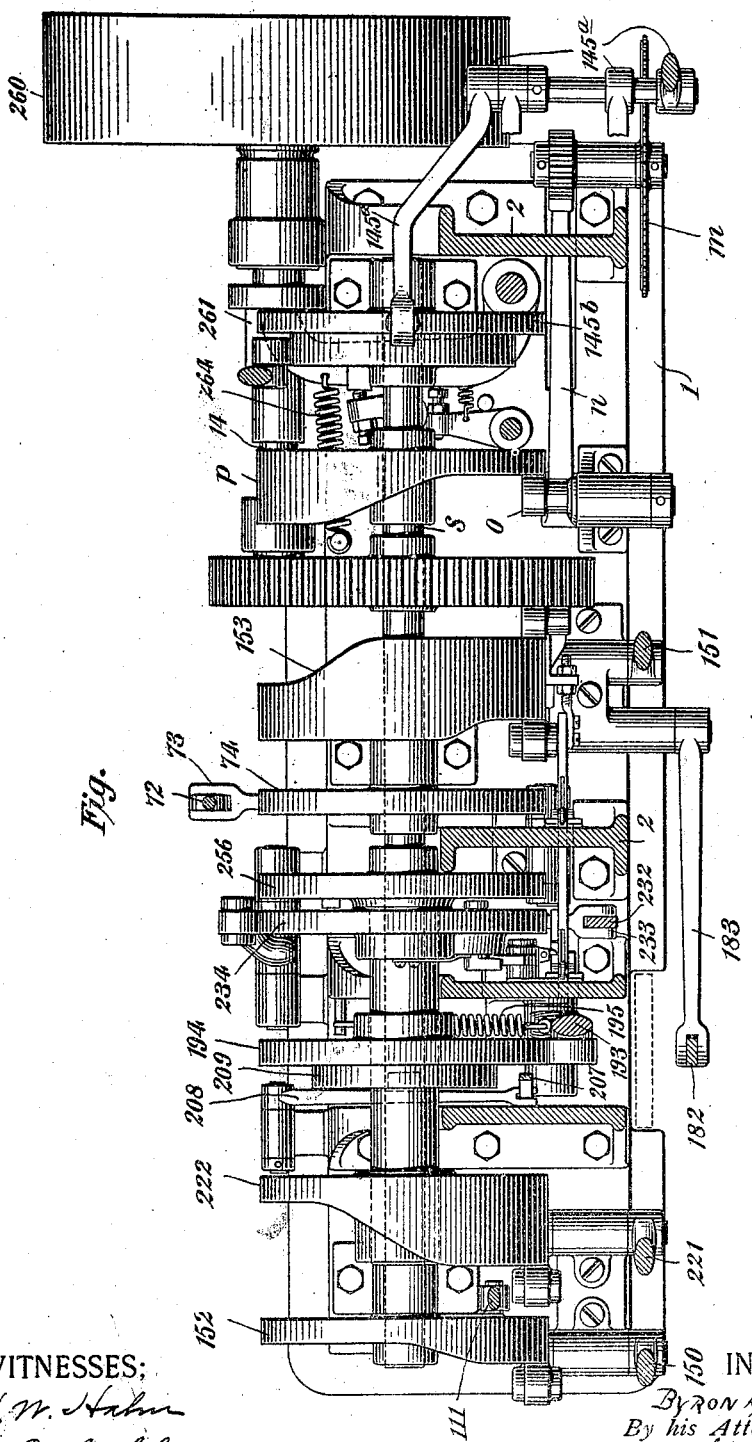

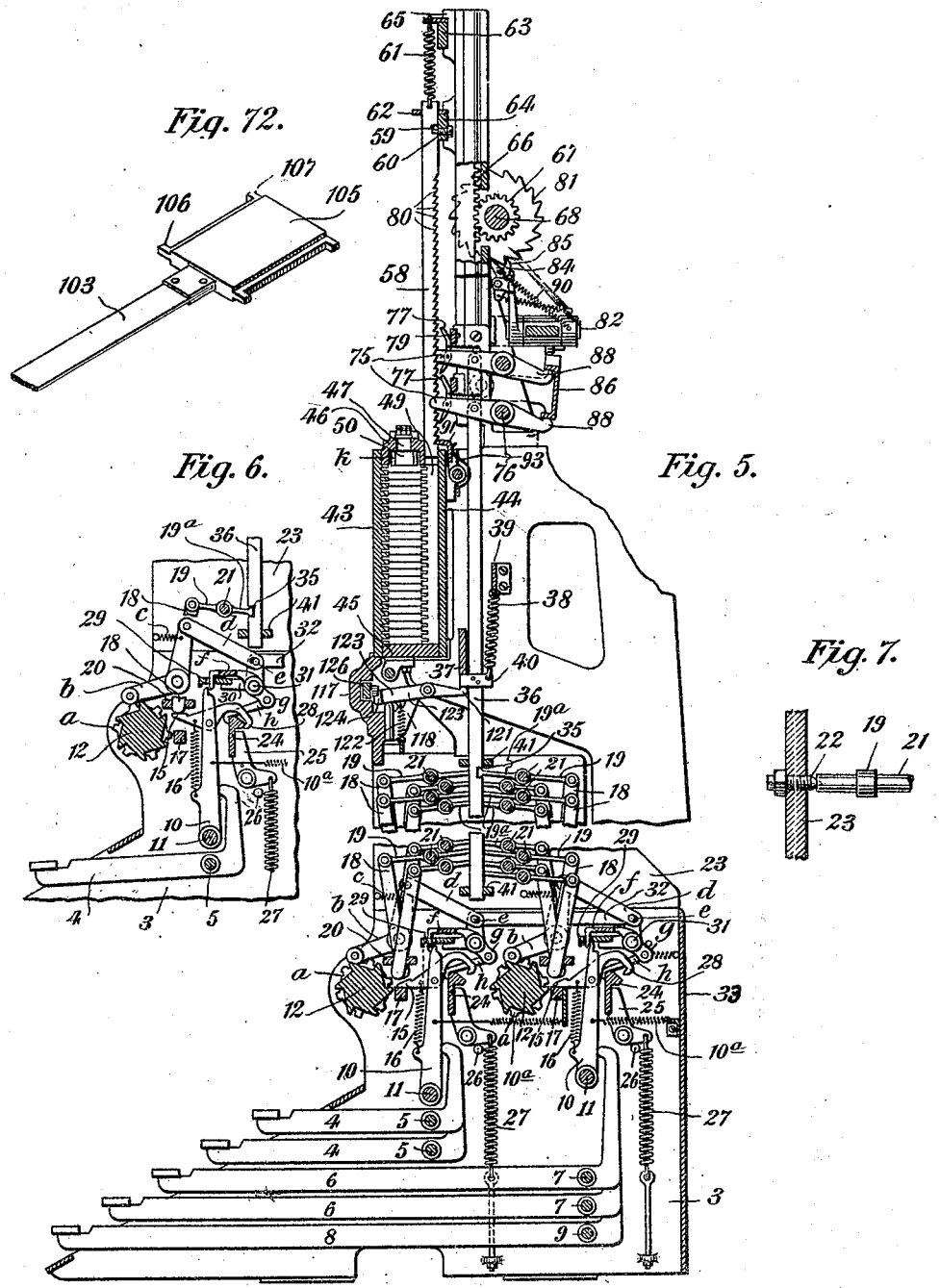

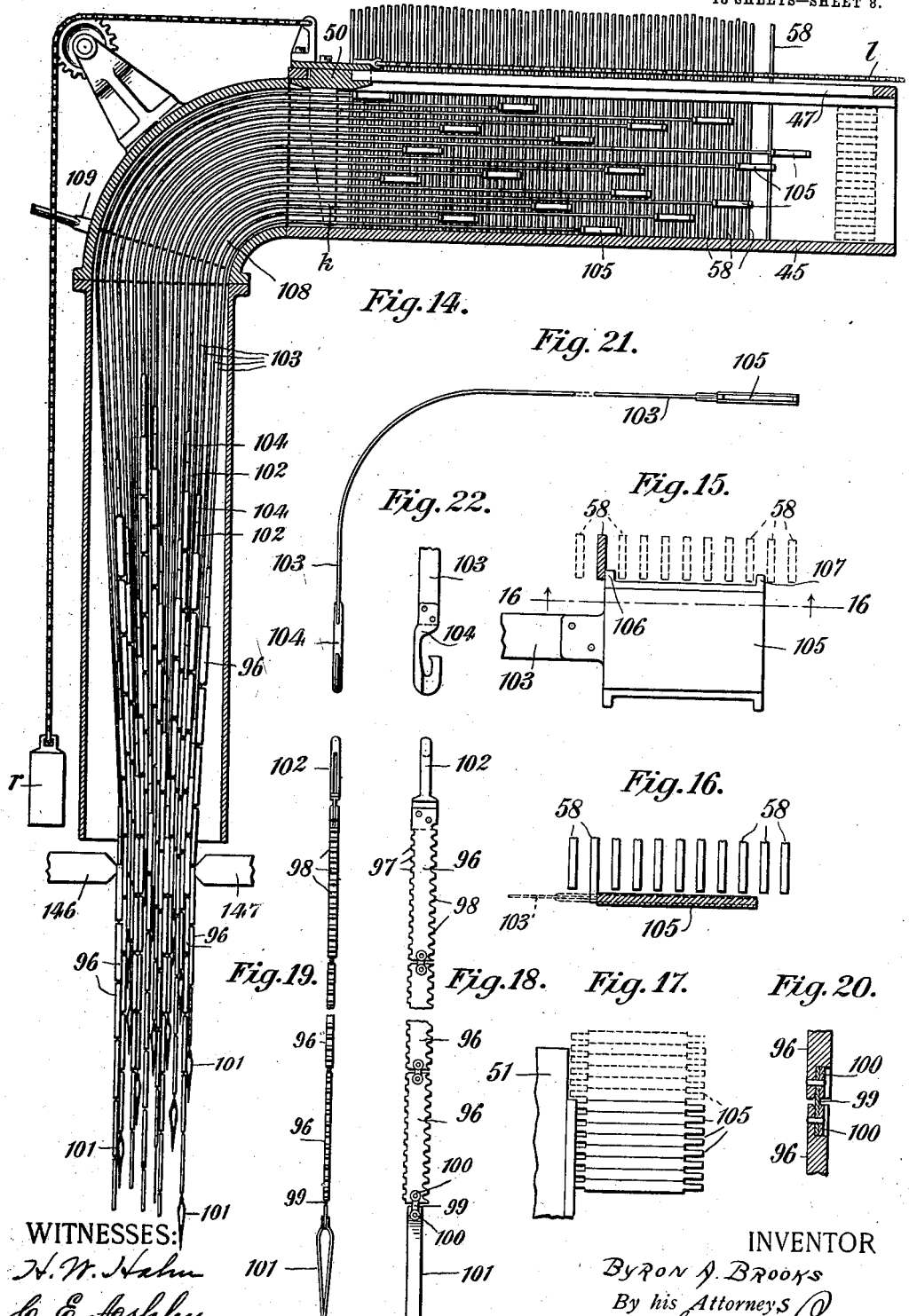

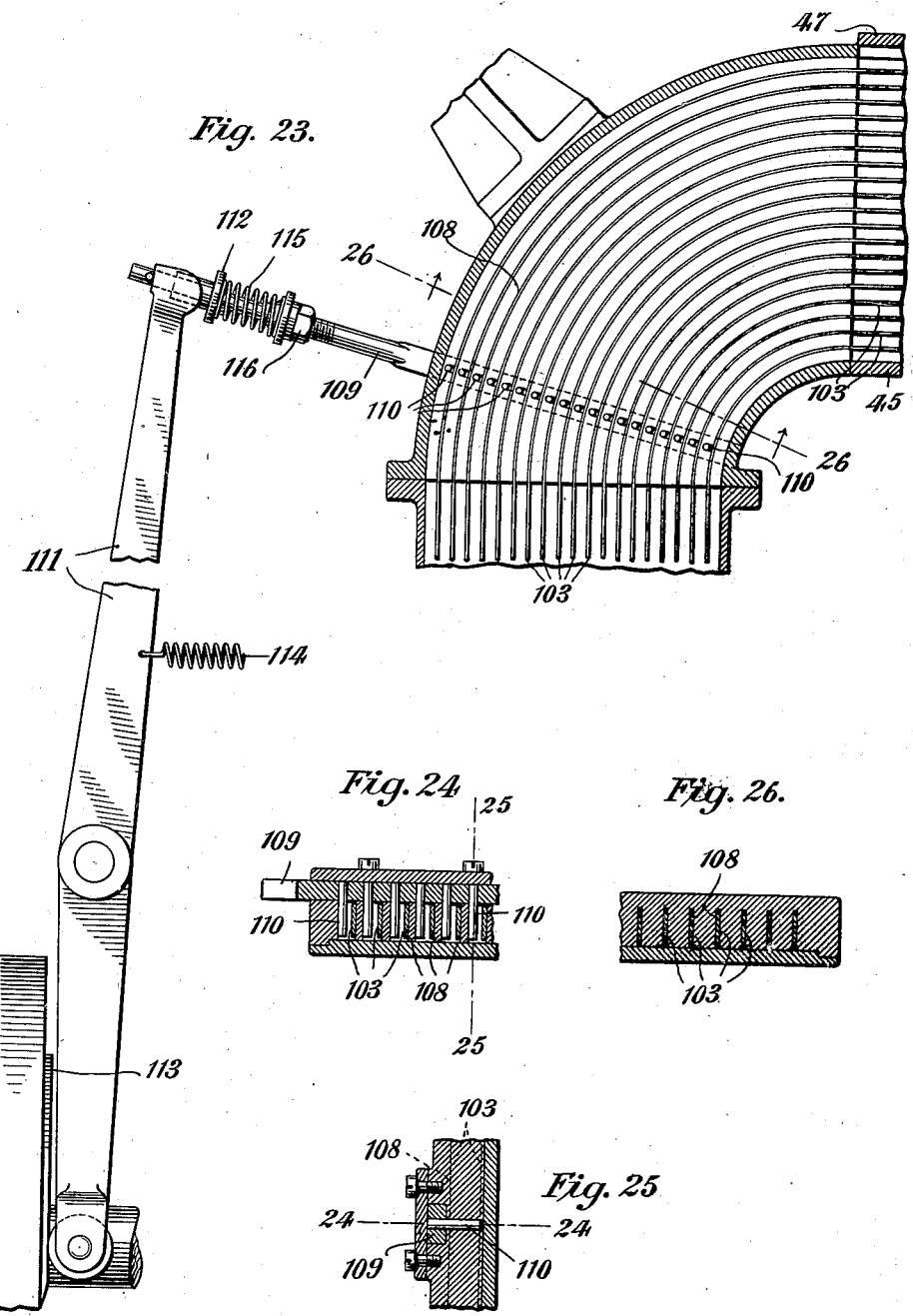

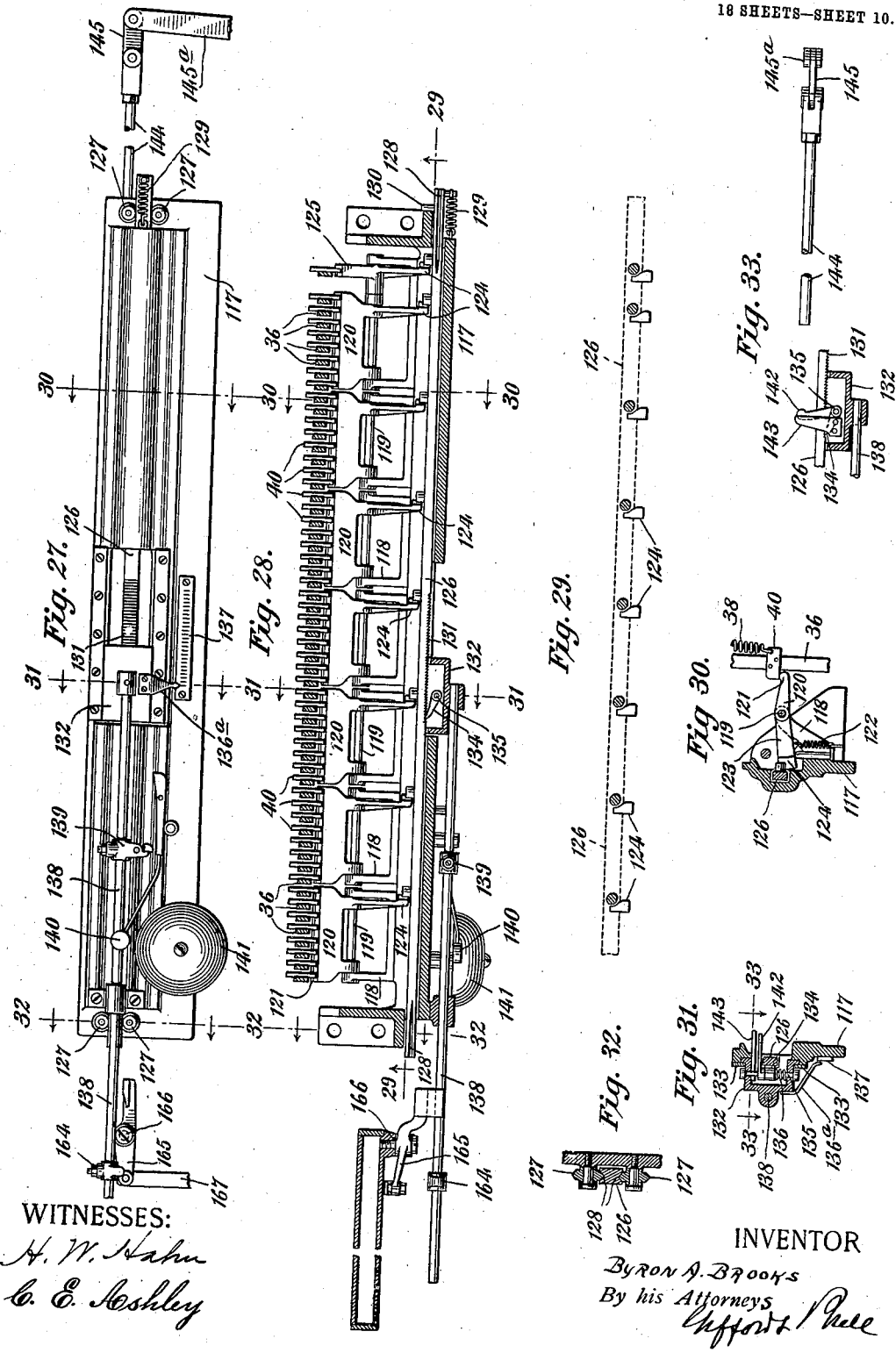

B. A. BROOKS.
TYPOGRAPHIC MACHINE.
APPLICATION FILED JUNE 20, 1906.
933,058.
Patented Sept. 7, 1909.
18 SHEETS—SHEET 11.
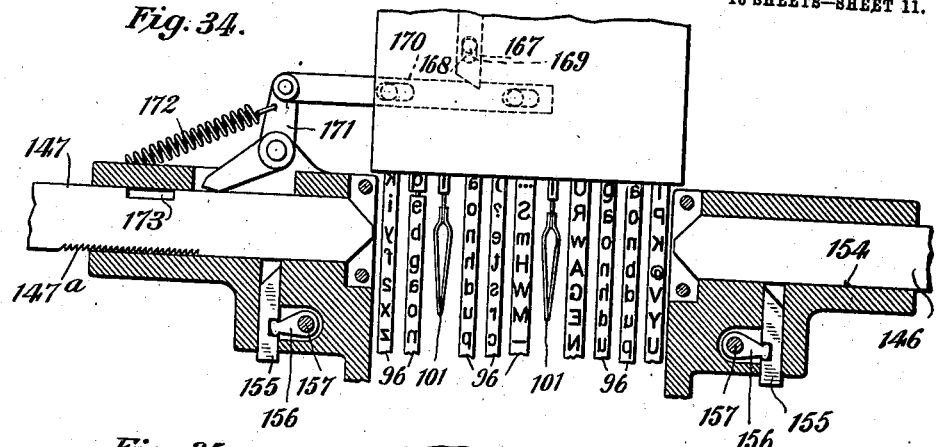
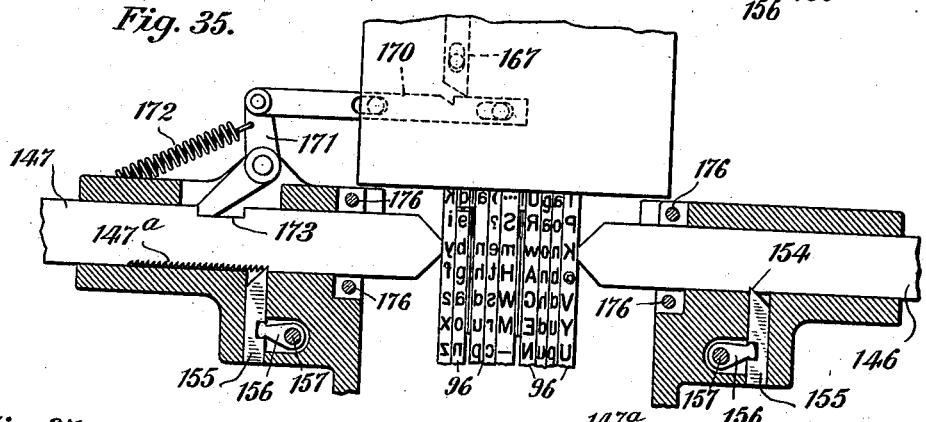
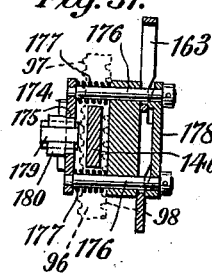
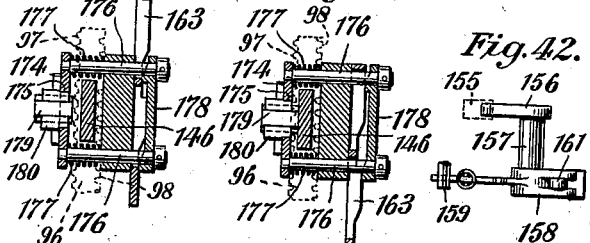
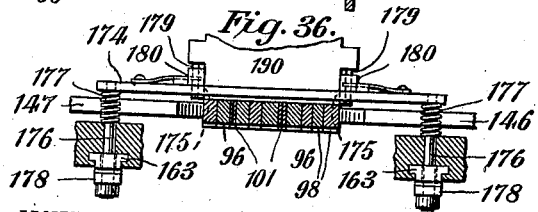
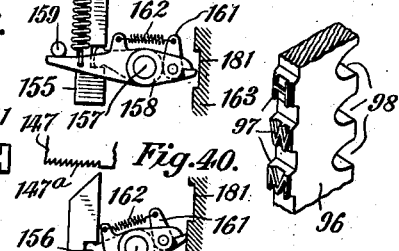
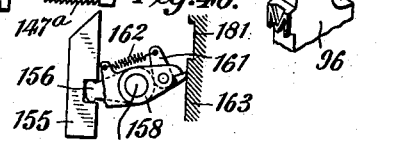
WITNESSES:
H. W. Hahn
C. E. Ashley
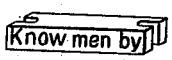
INVENTOR
Byron A. Brooks
By his Attorneys
Clifford + Pike B. A. BROOKS.
TYPOGRAPHIC MACHINE.
APPLICATION FILED JUNE 20, 1906.
933,058.
Patented Sept. 7, 1909.
18 SHEETS—SHEET 12.
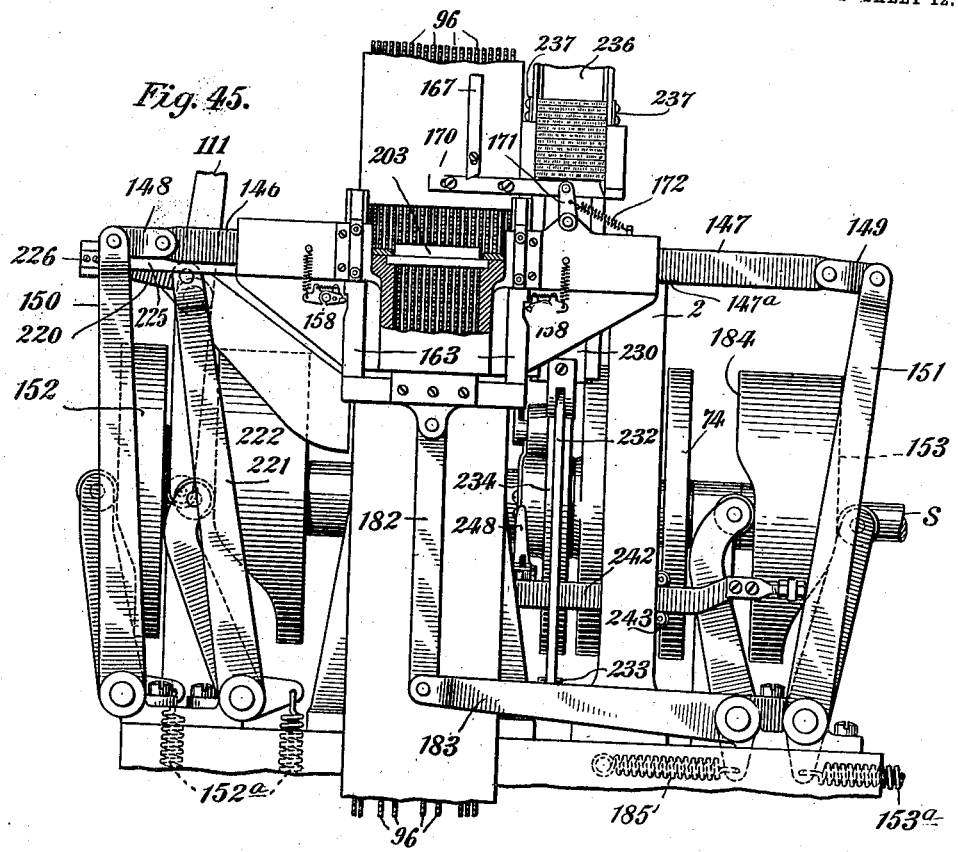
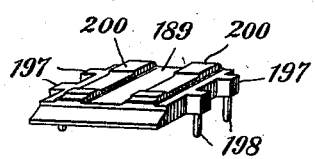
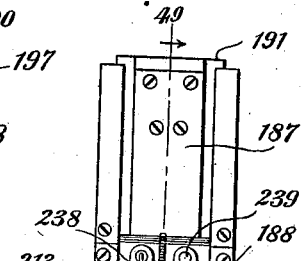
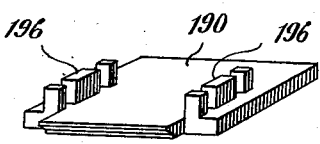
WITNESSES:
INVENTOR
Byron A. Brooks
By his Attorneys

B. A. BROOKS.
TYPOGRAPHIC MACHINE.
APPLICATION FILED JUNE 20, 1906.

933,058.

Patented Sept. 7, 1909.
18 SHEETS—SHEET 13.

WITNESSES:
N. W. Hahn
C. E. Ashley

INVENTOR.
Byron A. Brooks
By his Attorneys

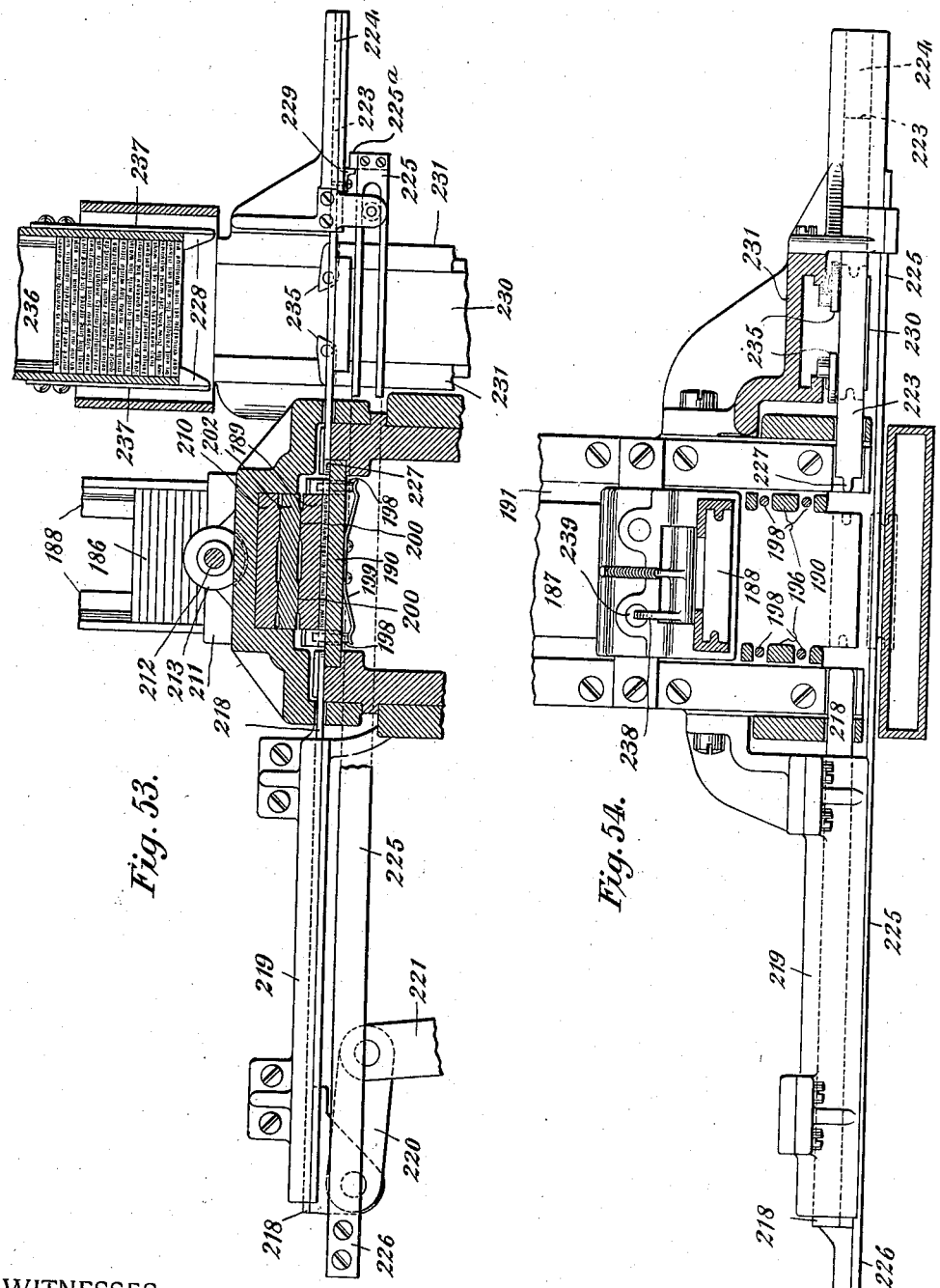

B. A. BROOKS.
TYPOGRAPHIC MACHINE.
APPLICATION FILED JUNE 20, 1906.
933,058.
Patented Sept. 7, 1909.
18 SHEETS—SHEET 16.
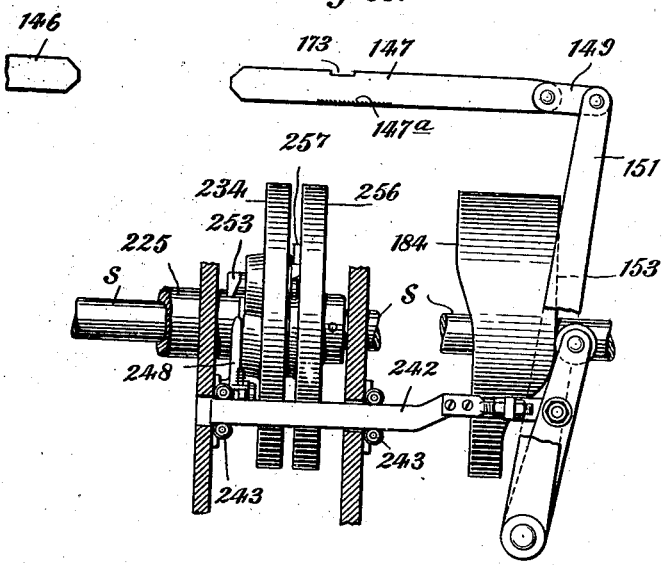
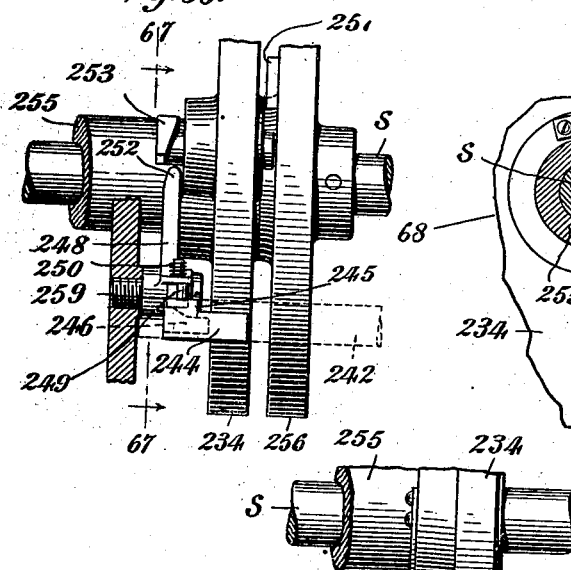
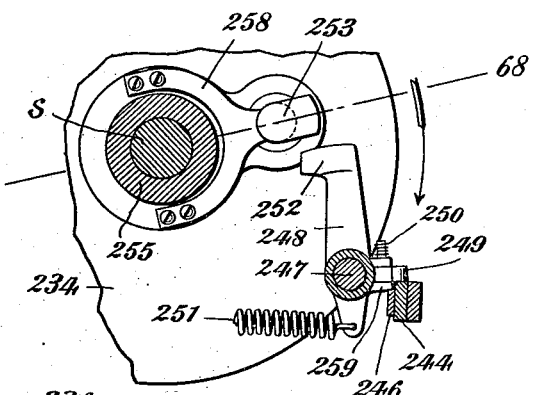
WITNESSES:
H. W. Hahn
C. E. Ashley
INVENTOR
Byron A. Brooks
By his Attorneys
Clifford & Snell

B. A. BROOKS.
TYPOGRAPHIC MACHINE.
APPLICATION FILED JUNE 20, 1906.

933,058.

Patented Sept. 7, 1909.
18 SHEETS—SHEET 15.

WITNESSES:
H. W. Hahn
C. E. Ashley

INVENTOR
BYRON A. BROOKS
By his Attorneys

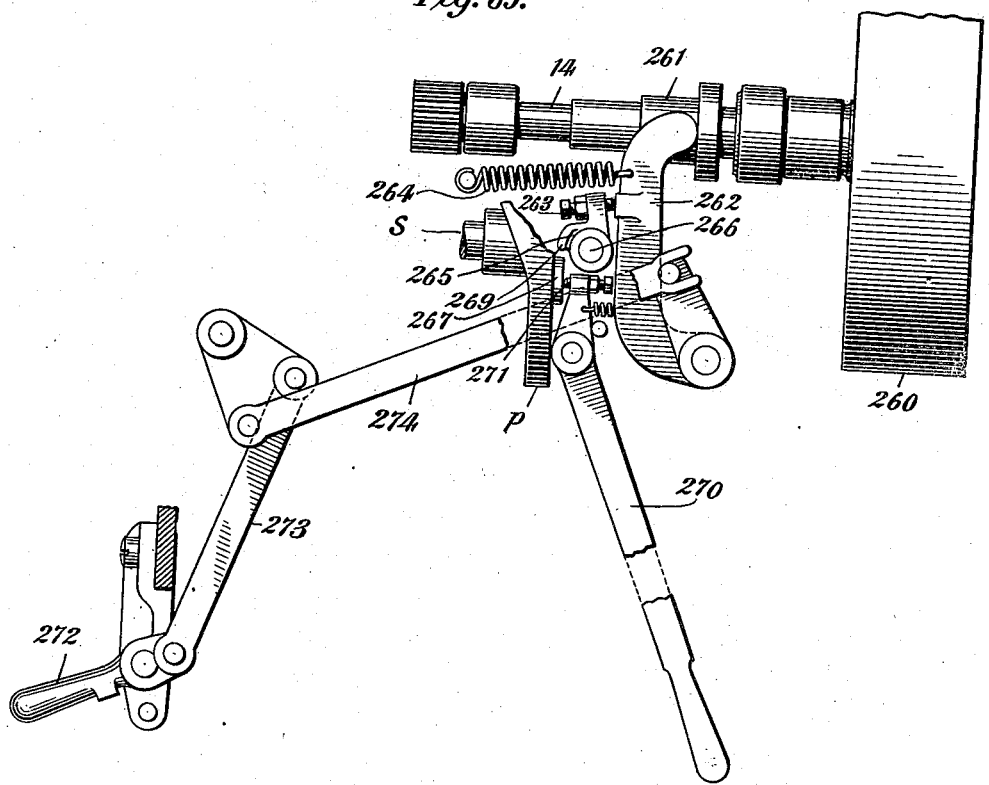
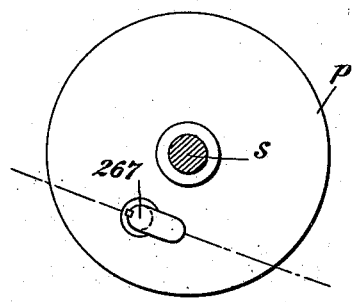
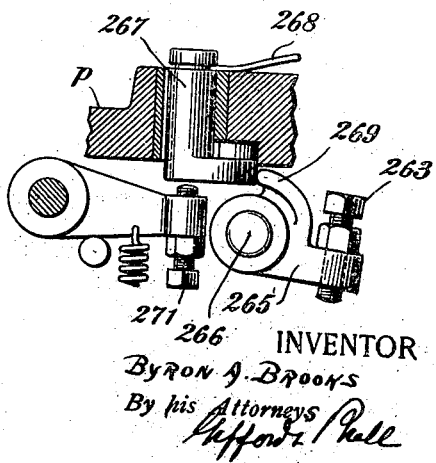

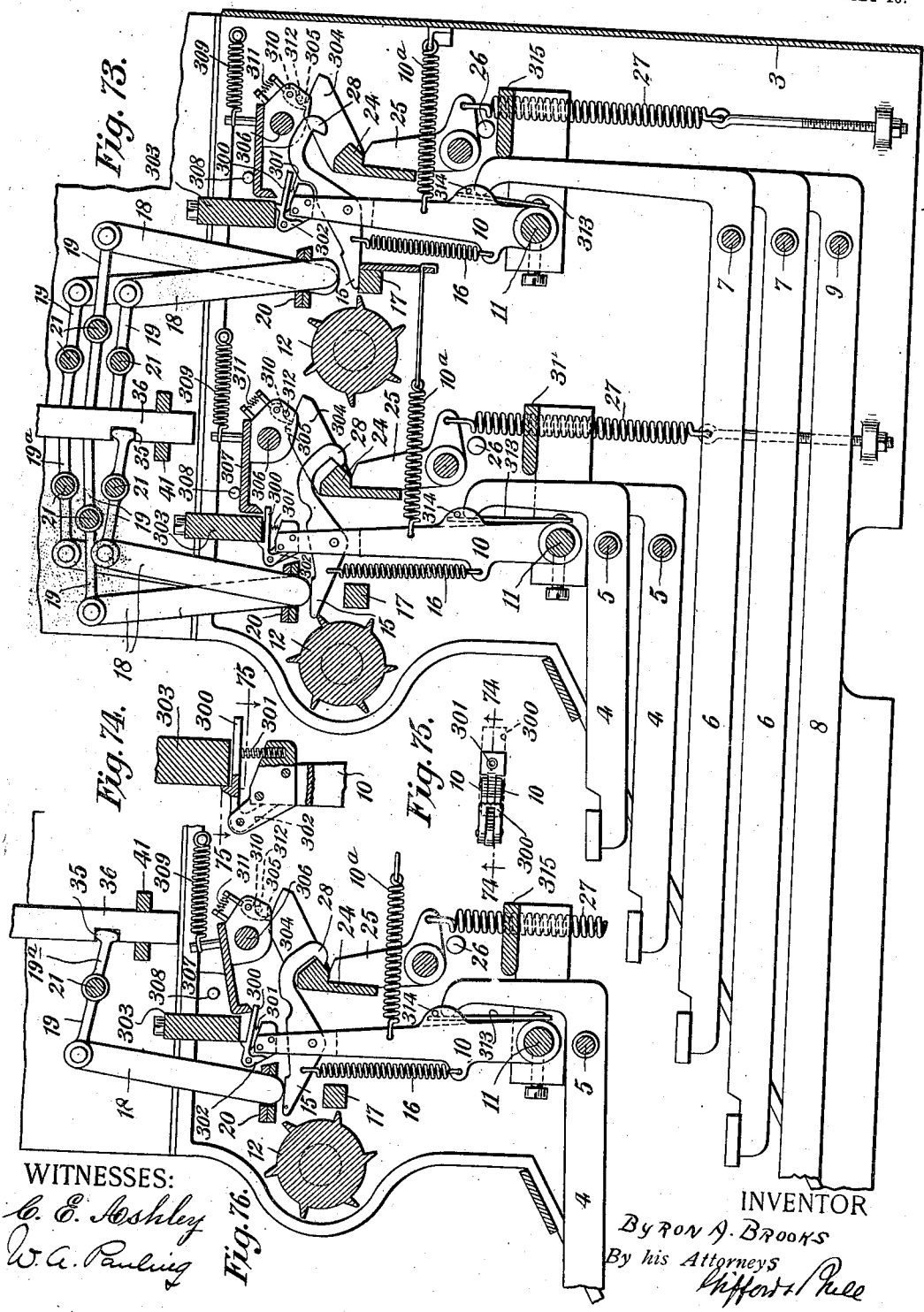

UNITED STATES PATENT OFFICE.

BYRON A. BROOKS, OF BROOKLYN, NEW YORK, ASSIGNOR TO THE BANDOTYPE COMPANY, A CORPORATION OF NEW YORK.

TYPOGRAPHIC MACHINE.

933,058.  Specification of Letters Patent.  Patented Sept. 7, 1909.

Application filed June 20, 1906. Serial No. 322,549.

*To all whom it may concern:*

Be it known that I, BYRON A. BROOKS, a citizen of the United States, and a resident of Brooklyn, borough of Brooklyn, in the county of Kings and State of New York, have invented certain new and useful Improvements in Typographic Machines, of which the following is a specification.

My invention relates to typographic machines and it consists of certain novel parts and combinations of parts particularly pointed out in the claims concluding this specification.

In the accompanying drawings, I have shown my invention embodied in forms which are at present preferred by me, but it will be understood that various modifications and changes may be made without departing from the spirit of my invention and without exceeding the scope of my claims, and also that the several features of invention referred to in the several claims are independent of each other.

The following is a description of the machine illustrated in the annexed drawings in which—

Figure 12:
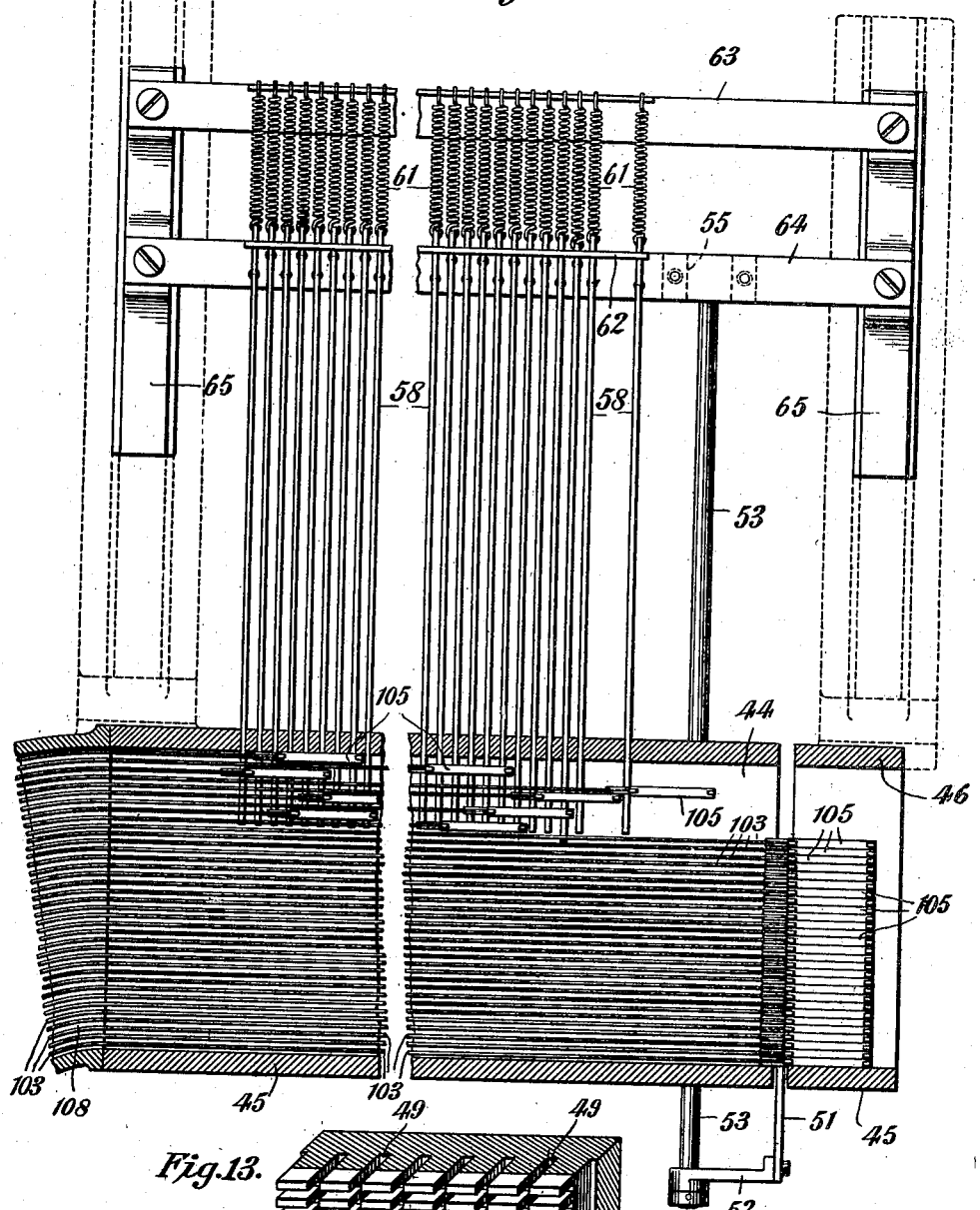
Figure 13:
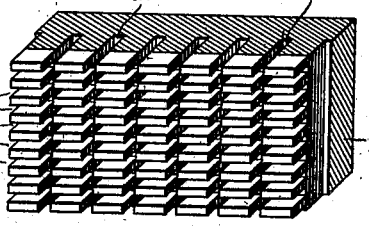
Figure 49:
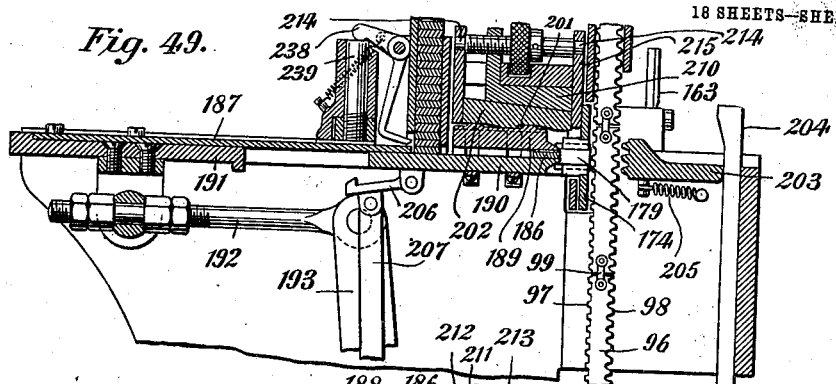
Figure 50:
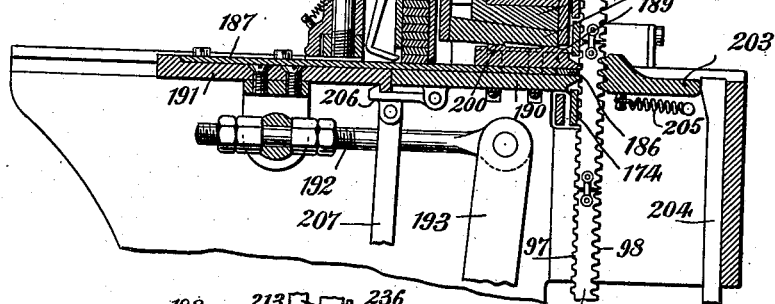
Figure 51:
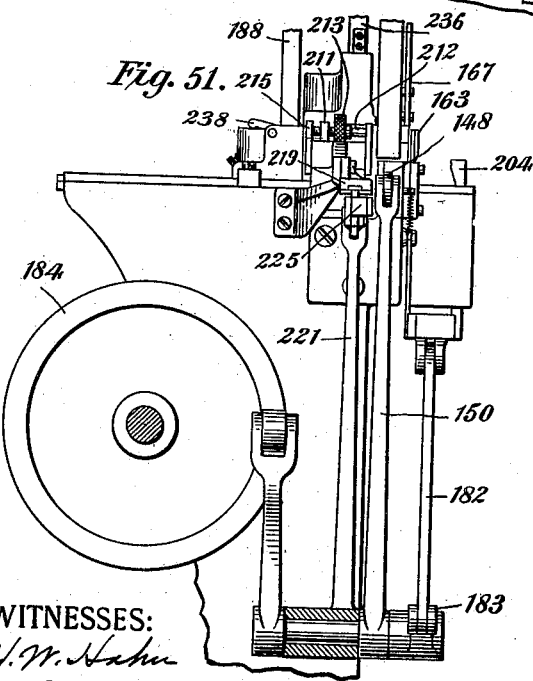
Figure 52:
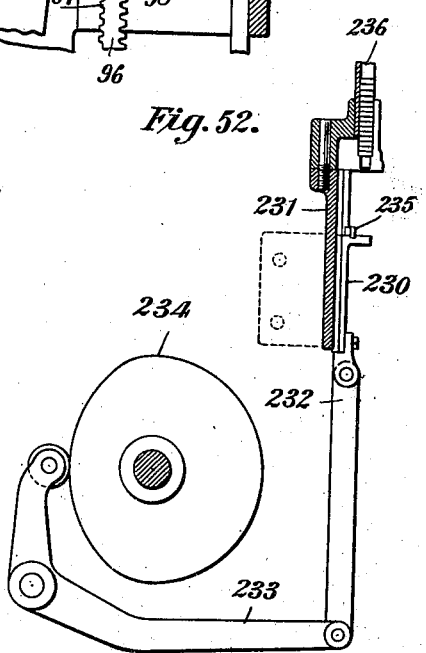
Figure 55:
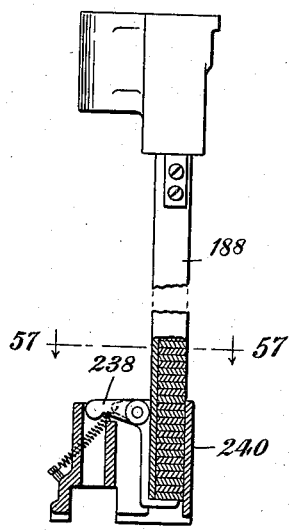
Figure 56:
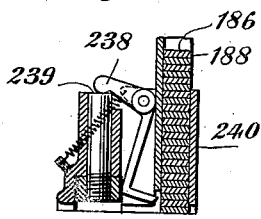
Figure 57:
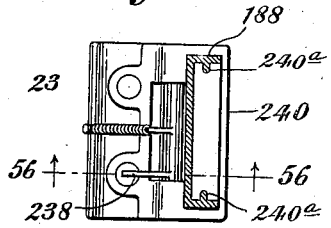
Figure 58:
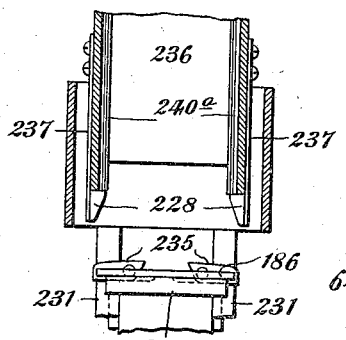
Figure 59:
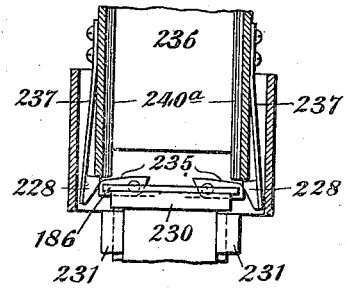
Figure 60:
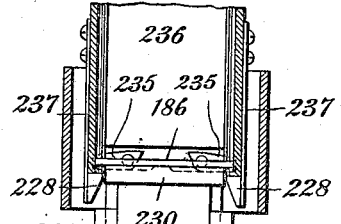
Figure 61:
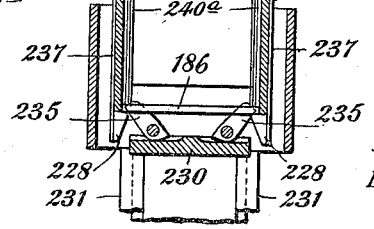
Figure 62:
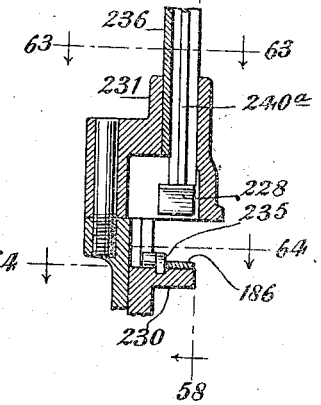
Figure 63:
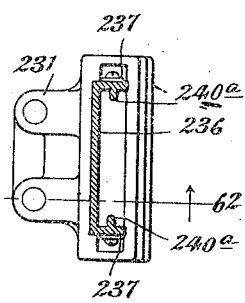
Figure 64:
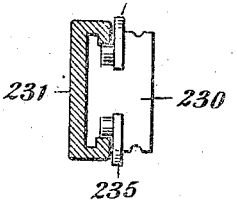

Figure 1 is a front elevation of a machine embodying my invention. Fig. 2 is a side elevation of the same. Fig. 3 is a plan of the same with the magazine removed. Fig. 4 is a plan of the same on the line 4, 4, Fig. 1. Fig. 5 is a vertical section through the keyboard. Fig. 6 is a view showing the position of the key mechanism when a key is depressed. Fig. 7 is a detail of the bearing of the transfer bar. Fig. 8 is a partial elevation of the magazine and stop bars looking from the rear. Fig. 9 is a section on line 9, 9, Fig. 8. Fig. 10 is a section on line 10, 10, Fig. 8. Fig. 11 is a detail of the upper end of the stop bar. Fig. 12 is a vertical section through the magazine showing the stop bars. Fig. 13 is a view showing the details of the guides in the magazine for the carriers and stop bars. Fig. 14 is a section through the magazine and casing showing the type bars, bands and carriers. Fig. 15 is a top view of the carrier, showing the stop bars. Fig. 16 is a section of the carrier showing the stop bars on line 16—16, Fig. 15. Fig. 17 is a view showing the details of the carrier escapement. Fig. 18 is a side elevation of the type-bar. Fig. 19 is a rear elevation of the type-bar. Fig. 20 is a view showing details of the flexible connection between sections of type bars. Fig. 21 is an edge view of the flexible band. Fig. 22 is a view showing details of the hook on the bands. Fig. 23 is a sectional elevation of the band guide and band friction device. Fig. 24 is a section through the friction device. Fig 25 is a section on the line 25, 25, Fig. 24. Fig. 26 is a section on the line 26, 26, Fig. 23. Fig. 27 is a front elevation of the indicator. Fig. 28 is a sectional plan of indicator showing the vertical key rods. Fig. 29 is a view showing details of the cams of the indicator on line 29, 29, Fig. 28. Fig. 30 is a section on line 30, 30, Figs. 27 and 28. Fig. 31 is a section on line 31, 31, Figs. 27 and 28. Fig. 32 is a section on the line 32, 32, Figs. 27 and 28. Fig. 33 is a section on the line 33, 33, Fig. 31. Fig. 34 is a sectional elevation from the rear of the type bars and vise jaws. Fig. 35 is a sectional elevation from the rear of the type bars showing vise jaws closed. Fig. 36 is a plan of the surface plate. Fig. 37 is a section of the surface plate and vise jaw. Fig. 38 is a section showing the surface plate in contact with type bars. Fig. 39 is a side view of the jaw pawl releasing device with the pawl acting on vise jaw. Fig. 40 is a view of the same device with pawl free of teeth in vise jaw. Fig. 41 is a view showing the pawl with the alinement cam going down. Fig. 42 is a plan of the jaw pawl releasing device. Fig. 43 is an enlarged detail of the type bar. Fig. 44 is a detail of the matrix. Fig. 45 is a front elevation, partly in section, of the alining and indenting mechanism. Fig. 46 is a plan of the alining and indenting mechanism. Fig. 47 is a detail of the upper indenting jaw. Fig. 48 is a detail of the lower indenting jaw. Fig. 49 is a section on the line 49, 49, Fig. 46, of the alining and indenting device. Fig. 50 is a section showing lead matrix bar being indented. Fig. 51 is an end elevation of the indenting and transfer devices. Fig. 52 is a view of the cam and levers for operating the elevator. Fig. 53 is a sectional elevation showing transfer slide elevator and galley. Fig. 54 is a plan of the same. Fig. 55 is a vertical section of the galley containing matrix bars. Fig. 56 is a view showing the holding lever released. Fig. 57 is a sectional plan of the galley enline 57, 57, Fig. 55. Fig. 58 is a sectional elevation of the galley and elevator on line 58, 58, Fig. 62. Fig. 59 shows the elevator opening the springs of the galley. Fig. 60 shows the elevator at highest point with the matrix in the galley. Fig. 61 shows the elevator leaving the matrix in the galley. Fig. 62 is a vertical section on the line 62, 62, Fig. 63. Fig. 63 is a section on the line 63, 63, Fig. 62. Fig. 64 is a section on the line 64, 64, Fig. 62. Fig. 65 is a view showing automatic stop for indenting device. Fig. 66 shows a detail of the clutch. Fig. 67 is an end view of the clutch on the line 67, 67, Fig. 66. Fig. 68 is a section on the line 68, 68, Fig. 67. Fig. 69 is a plan showing the starting and emergency clutches. Fig. 70 is a front view showing the clutch disk and pin. Fig. 71 is a detail showing clutch pin and means for operating the starting clutch. Fig. 72 is a perspective view of band and carrier. Fig. 73 is a section through modified key board. Fig. 74 is a detail showing lever 10 at release. Fig. 75 is an enlarged view of pawl.

Referring to the drawings: In Fig. 1, 1 is a base on which the shafts and brackets are fixed. 2—2 are the main brackets for supporting key-board and magazine mechanism.

*Key-board.*—Fig. 5, side frames 3—3 of the key-board are bolted to brackets 2—2. 4—4 are key bars fulcrumed at 5—5. 6—6 are levers fulcrumed at 7—7. 8 is the space-bar-lever fulcrumed at 9. The upper ends of these levers bear against the levers 10—10 fulcrumed at 11 and have return springs 10$^a$, 10$^a$. The ratchet shafts 12 are driven by the round belt 13 from the driving shaft 14, and are for the purpose of lifting the pawls 15 when the lever 10 is pressed forward on striking a key. "*a*" is a cam fastened to the ratchet shaft 12 which acts on the lever *b*, held by spring *c*, to raise and lower the plate 29, fulcrumed at 31, on lever 30. Link *d*, connecting *b* and lever 30 at upper end is slotted at *e*. This permits the plate 29 to be raised by lever 10 independent of cam *a*. When the lever 10 is pressed forward by a finger key, the upper end of lever 10 is held by the plate 29, while the pawl 15 is being raised by a tooth of the ratchet shaft. At the instant the pawl is raised to the extreme height, the cam *a*, through its lever *b*, and link *d*, raises the plate 29 and permits the lever to return to its normal position. The pawls 15 are held by a spring 16 on stop 17. Fig. 6 shows the pawl 15 in the raised position. 18—18 are bars connected to levers 19—19 and guided by slotted plates 20—20, which are raised by the pawl 15 when it is acted on by ratchet shaft 12. The levers 19 are fastened on transfer rods 21. The transfer rods are pivoted on conical bearings 22 (Fig. 7), secured into the frames 23. 24—24 are cam-shaped bars fastened to levers 25—25 which are held against a stop 26—26 by springs 27—27. When the pawl 15 is raised, its end 28 is forced over cam-bar 24, which will then hold the pawls 15 out of contact with the revolving ratchet 12. A toothed plate *f* is fastened to levers *g*. Each tooth of plate *f* passes through a hole in the plate 29, corresponding to each lever 10. When the lever 10 is released by plate 29, it strikes on the plate *f*, which prevents the key from returning to its normal position. A link 32 connects the plates *f* and *f* through an upper extension of lever *g*. On lever *g* a projecting arm *h* is fastened, the outer end of which impinges on plate 24. When the plate is pressed forward by pawl 15, the plates *f* are raised by the action of arm *h* through lever 24 and the lever 10 falls back to normal position. By this means the preceding key will be held in such a position that it will indicate the last letter struck. 33 is a cover to back of key-board.

*Key-board transfer.*—The ends of levers 19$^a$ bear in grooves 35, cut in vertical bars 36, held upward against a stop 37 by springs 38 secured to a bar 39 and to a cross-piece 40, fastened on the vertical bar, which serves as the stop against the stop bar 37. The vertical bars 36 are held in line by guides 41—41. Levers 19 are so placed on the bar 21 (Fig. 1,) that the motion of rods 18 operated by finger keys is transferred to rod 36 by another lever 19$^a$ on the same rod 21, (see Fig. 1) which corresponds in the magazine to the letter struck on the key-board.

*Magazine.*—The magazine 42 (Fig. 1 and in Figs. 8, 9, 10, 12 and 13) consists of grooved side plates 43 and 44, bottom plate 45, and an upper plate 46, with a slot 47 for a slide. Horizontal grooves 48 run the length of the magazine, in which carriers 105 (Fig. 15) connected to the bands of type bars slide. In the vertical grooves 49 in the plate 44, Figs. 10 and 13, the stop bars 58 are guided. The carriers 105 are held in normal position by a plate 51 moved vertically by a sliding frame to be hereinafter described. Plate 51 is fastened to levers 52, fulcrumed on a shaft 53, which slides in a bearing 54 and is fastened by a pin in bearing 55 attached to sliding frame. The plate is held by a spring 56, in the path of the carriers through a slot 57 in back of magazine. The stop bars 58, one for each character on the type bars, have their lower ends in grooves 49. The upper end of stop-bar 58 has a groove 59, (Fig. 11) in which a stop-screw 60 enters, the spring 61 secured to cross bar 63 holding the lower end of the groove against the screw. 62 is a slotted guide-plate for upper ends of bars 58. Cross bars 63—64 (Fig. 5) are secured to the vertical slides 65—65. Racks 66 on the slides engage with the pinions 67 mounted on shaft 68. Pinion 69 (Fig. 3) on the shaft is in mesh with a sector 70 (Figs. 2 and 3) fulcrumed at 71, and is operated to return the vertical slide and stop bars to their upper position, when the composed line is indented by rod 72, connected to lever 73 and cam 74. Levers 75 (Fig. 9) fulcrumed at 76, carry a pawl 77, held by a spring 78 against the bar 79. The pawls are cam-shaped on the back. The vertical bars 36 are pivoted to the levers 75. When a bar 36 descends by a key being struck, as described, the pawl 77 will engage in a tooth 80 on the back of the stop-bars 58 and cause the stop-bar to lower one tooth, in advance of the rest of stop-bars, which will then act as a stop for the carrier and locate the selected letter on the type-bar at its proper position. On the shaft 68 is fastened a ratchet-wheel 81. Fulcrumed at 82 is a lever 83, which at its upper ends has pivoted two pawls 84—85. The lower end of lever 83 has a roller which bears on a cross-bar 86, fulcrumed at 87, 87. Whenever a key is operated, the end 88 of lever 75 will raise the bar 86 and cause the lever 83 to turn on its axis. The pawl 84 which has no backward movement, is released from the ratchet wheel 81 and the pawl 85, which swings backward against the lever as a stop engages with the ratchet, which will revolve sufficient to allow the stop-bar sliding frame to descend the required distance equal to the distance between the letters on the type-bar. The movement of pawl 77 is twice the distance between the letters on the type-bar so that, as it moves with the stop-bar frame, the stop-bar selected will be advanced ahead of the remaining bars. On the key being released, the lever 83 is drawn back by spring 89, so that the pawl 84 enters the ratchet. Pawl 84 is held against the lever 83 by a spring 90, which is pressed forward to allow the ratchet to turn in the direction to raise the stop-bar frame when the operation is completed. When a stop-bar is lowered by key, it is necessary that it be held in its position until the next letter is struck. 91 is a pawl fulcrumed at 92, which extends the length of the magazine, and is held in the position shown by a spring 93. On the raising of the stop-bar frame the pawl is released from the ratchet teeth of the stop-bars by a lever 94 and rod 95, which is operated by a cam or cam shaft. The plate 51 (Figs. 8, 10, 12) which is attached to the stop-bar, the sliding frame through its connection at 55, holds the carriers 105 in normal position. As the frame descends, on striking a key, the upper corner is released and the type-bar falls until the carrier strikes its selected stop-bar. When the matrix is formed the type-bars are returned to normal position by the sliding bar 50 with plates K operated by chain *l*, chain wheel *m*, section *n*, lever *o*, and cam *p* as shown in Fig. 1, which raises the bars until coming in the position shown in Fig. 10 and is a weight for returning slide 50, to the position shown in Fig. 14.

*Type-bars.*—The type-bars 96 (Figs. 14 to 21) consist of a series of type-bars flexibly connected together as shown, the type being in relief. The type faces are shown at 97 and the alinement groove at 98 for the vertical alinement of the type-bars. The flexible connection enables the type bars to be properly alined. The sectional Fig. 20 shows the flexible spring 99 centrally located connecting the bars 96. 100 is a washer which is riveted over the flexible connection. The space-band 101 is composed of two flat springs, which enter the line, as shown in Fig. 19, but are compressed to the necessary thickness to justify the line, as shown in Fig. 14. The type bar characters consist of all the type, punctuation marks, figures, etc., which are used in a font of type. To the upper section of the bar is fastened a female end of a hook 102. Fig. 21 shows the flexible band 103, on the lower end of which is fastened the male end on which the hook 102 of the type-bars fastens. 105 is the carrier to which the band is fastened at the upper end. The carrier (Fig. 15) is shown in connection with the stop-bars 58. Projection 106 of the carrier acts on the stop-bar. The distance between the projection 106 and the rear projection 107 is such that the other stop bars in descending do not come into contact with the rear projections. The bands 103 are guided around the quadrant by guides 108. After the machine has completed its operation of indenting the lead bars, a slide 109 (Fig. 23) (in the rear of the quadrant) on which are pins 110, one for each band, is operated before the stop-bar frame is raised, so that the pins will bear against the bands and hold them by friction against their guides. This friction is maintained until the stop-bars are raised and the carriers returned to the normal position. The slide is actuated by lever 111, which bears on the washer 112 on the slide acted on by cam 113 and spring 114. A spring 115 on the slide takes the thrust and can be regulated as to the amount of tension the pins will have against the flexible bands by nut 116.

*Indicator.*—A casing 117 (Figs. 27 and 28) is fastened to brackets 23—23 (Fig. 2.) Secured to casing 117, are brackets 118 and shafts 119 carrying levers 120. The levers at point 121 impinge against the stop-pieces 40, on rod 36, and are held in that position by spring 122. On the end 123, of lever 120 is fastened a cam 124. The lever is of sufficient width so that it can bear against as many stop-pieces 40 as there are types or characters on a section of the type bar. The cam throw of each lever is equal to the width of the letters on that section of the type bars.

The lever 125 acts against the bar which represents the space band. A sliding bar 126 is supported on rollers 127, which run in the grooves 128 of the bar. A spring 129, holds the bar 126 against the neutral faces of the cams. A pin 130 serves as a stop. The bar 126 has teeth 131 cut on its outer face. A slide 132, guided by ways 133, has a pawl 134 fastened on shaft 135. The spring 136 (Fig. 31) causes the pawl to engage in the teeth 131 of the slide bar, when the slide bar is moved to the right by the cams. Then the key is struck and bar 36 descends, the slide 132 is carried with it and left in its advanced position while the slide bar is returned to its normal position by spring 129. The distance which the slide 132 is advanced to the right will be equal to the width of the letter on the type bar which has been selected by the operator. A pointer 136ª on the slide 132 indicates on the scale 137 the length of the composed line of type bars. A rod 138, fastened to the slide 132 has a trip 139, which, when moved to within a short distance of the required length of the line, will trip the bell-striker 140 and cause it to strike the bell 141 to notify the operator. Fastened also on shaft 135 is a lever 142, and secured to the slide is a projection 143, (Fig. 33). A rod 144, with a link 145, is operated by the cam-lever 145ª and cam 145ᵇ to return the slide to its normal position. The end of rod 144 first raises the pawl out of contact with the teeth of the sliding bar by striking lever 142, and then, by striking the projection 143 it pushes the slide back. The rod then returns to its first position.

*Vise-jaws*, (Figs. 34 to 45).—Vise-jaw 146—147, connected by links 148—149 to levers 150 and 151, which are operated by cams 152 and 153, the levers being held against the cams by springs at 152ª and 153ª (Fig. 45.) After the line of type bars are composed, the machine is started. The left-hand jaw 146, whose position at the starting of a line is a fixed one, is closed by the cam 152. The jaw has a tooth 154 cut on its lower side, into which the sliding pawl 155 engages, when the jaw is at its proper location. The sliding-pawl has a groove into which a lever 156, fulcrumed on shaft 157, engages. Fastened to shaft 157 is another lever 158, which is held against a stop 159 by a spring 160. On the lever 158 is fulcrumed a lever 161 held by spring 162. The lever 158 is operated by grooves in the cam slides 163. The right-hand vise-jaw has teeth 147ª cut on its lower side. Its sliding-pawl 154 is operated similarly to the right-hand jaw sliding pawl. The sliding-pawls 155 engage in the teeth of the vise-jaws when the jaws close, and are withdrawn by cams 163 after indenting. When sufficient type-bars have been composed to fill a line, the movement of the right-hand jaw is governed by the position of the pointer on the indicator. The rod 138 (Figs. 1 and 27) has an adjustable tripping-piece 164. The lever 165, fulcrumed at 166, has a cam-shaped end on which tripping-piece 164 impinges. When the line is full, the lever 165 will raise the bar 167, which has elongated holes 168 to guide it, and is held by screws 169. This movement releases the horizontal bar 170, guided in a similar manner to 167. Bar 170 is connected to a lever 171, held in place by a spring 172. The release of the bar allows the lever to fall into a groove 173 in the right-hand jaw, which would give the correct length of line. In case the line is not filled, this action does not take place, and the right-hand jaw movement continues until it is checked by the last type-bar. The retraction of the jaw restores the bar 170 to its normal position. A surface-plate 174 (Figs. 36, 37, 38, 49 and 50) with an opening 175 for the indenting jaws, is fastened to slide rods 176, and held in outermost position by springs 177. Cam pieces 178 are acted on by the cams 163 which are grooved for the rods 176 to pass through.

*Vertical adjustment of type bars.*—After the surface plate 174 has operated, the alinement slide 203 is acted on by cam-slides 204. The alinement plate has on its inner face grooves which correspond to the grooves 98 in the type-bar, which serve to bring all the types to the same height (Fig. 50). A spring 205 returns the bar to its position, shown in Fig. 49. The cam slides are operated through levers 182—183 and cam 184. Spring 185 retracts cam slide (Fig. 45). On the surface plate 174 are slides 179 in guides 180, normally held out of engagement of type-bars 196, by leaf-springs mounted on plate 174. At the time of indenting, indenting jaw 190 is advanced and strikes slides 179, carrying them forward to act as side jaws to the type-bars, as shown in Fig. 36. The surface plate 174 alines the type faces. Grooves 181 in the sliding cams 163 operate the lever 158. The cams 163 are operated through levers 182 and 183, cam 184 and spring 185 (Fig. 45).

*Indenting*, (Figs. 49 and 50.)—The bar of lead, or other suitable material, 186, is moved by slide 187 from magazine 188 to the indenting jaws, 189 and 190. The slide 187 is fastened to a guide-plate 191 which has an adjustable rod connection 192 to cam-lever 193, operated by cam 194, (Fig. 4). The lever is held against the cam by a spring 195. The slide 187, after separating a lead strip, advances until guide plate 191 strikes jaw 190. The jaws 189 and 190 (shown in perspective Figs. 47 and 48) are held in a relative position with each by the projection 196 on 190 fitting in the slides 197 of jaw 189. The pins 198 of jaw 189, pass through holes in jaw 190 (shown in Fig. 53). The end of the pins bear on the flat-spring 199, fastened to the jaw 190, which gives a tendency for the jaws to open by raising the upper jaw. As the jaws are advanced by slide 191 the cam surface 200 on the upper jaw 189 (Fig. 49) are acted upon by cams 201 of the plate 202. This causes the jaw to close on the lead strip. A further advance of the slide impresses the lead against the composed type-bars and it receives an impression. Fig. 50 shows the lead strip being impressed or indented. After the guide plate 191 strikes the jaw 190, the lever 206, fulcrumed to jaw 190, is raised to the position shown (Fig. 50) by lever 207—208 and cam 209 (Fig. 4). When the slide is retracted, its first movement is to draw away the lead strip from the type-bars by the clamped jaws 189 and 190. When the jaws have reached the position shown (Fig. 49,) the lever 206 is released by its cam. The jaws on this outward motion have also opened and released their pressure on the lead strip. The slide returns to its first position, and as it passes under magazine, a lead strip drops into place before it. The cam-piece 202 has an angular top which slides a piece with a corresponding angle, 210 having a projection 211 and a screw 212. The screw has a knurled nut 213 and turned ends 214, which bear in plates 215. On turning the screw, the plate 210 is moved and causes a closing or opening of the jaw 189, for the purpose of adjusting the distance between jaws 189—190 for different sizes of fonts. A pointer 216, fastened to 210, and a graduated scale 217, fastened to plate 215, will indicate the thickness of the line.

*Ejector*, (Figs. 53 and 54.)—An ejector-blade 218, guided in slide 219, is connected to a link 220 and cam-lever 221, operated by a cam 222 (Fig. 45) ejects the lead matrix from the indenting jaws and places it on the top plate of the elevator. Auxiliary blade 223 is mounted in a slide 224, and is operated by a slide-bar 225, fastened at 226, to ejector. The blade 223 is moved toward the elevator when the ejector-blade 218 pushes the indented-bar so that the end 227 enters the grooves in the indented bar. It is returned to normal position by projection 225ᵃ on bar 225 striking the lug 229 fastened to blade 223. This auxiliary belt insures the matrix-bar being transferred correctly from the jaws to the elevator.

*Elevator*, (Figs. 52 and 53.)—The elevator 230 is guided in bracket 231 operated by bar 232 and a lever 233, through a cam 234. The elevator has two pawls, 235, fulcrumed to its top. Galley 236, with side springs 237 for holding the matrix-bars, is in a vertical line with the elevator 230. When the bar is deposited on the elevator, its upper motion will open the springs 237, by the pawls impinging on the ends 228 of the springs (Fig. 53). On the retraction of the elevator, the lead bar will be held by the springs 237.

*Magazine for led bars and matrix*, (Fig. 55.)—When the magazine 188 is placed on the machine, the lever 238 strikes on the pin 239, (Fig. 56). The lever 236 forms the bottom of magazine and in striking on the pins, swings the bottom so that the lead strips will fall to the indenting jaw 190. The plate 240 will prevent more than one strip from being advanced by slide 187. 240ᵃ are ribs to hold lead bars laterally. Figs. 58, 59, 60 and 61 show the magazine (Fig. 55) inverted and used to receive the matrix bars and different positions of elevator and action of elevator pawls 235.

*Automatic safety clutch.*—Figs. 65, 67 and 68 show a device for automatically preventing the indenting of a lead bar, if by error the operator should fill his line of type-bar too full. Fastened to the cam-lever 151, for operating right-hand jaw, is an adjustable bar 242 guided by rollers 243. Fastened to this bar is a steel piece 244, having an offset 245, and to this is screwed a cam-piece 246. Fulcrumed at 247 is a lever 248 having a pawl 249 at its lower end, which is held by spring 250 in the position shown. A spring 251, fastened to lever 248, holds the pawl 249 on the cam piece 246. If the line is too full, the pawl is held in the position shown, by the steel piece 244. The cam-shaped end 252 of lever 248 would then act on the clutch-pin 253, which slides in the casting 234. This casting is secured with the cams for indenting, locking and ejecting on a sleeve 255 loose on the camshaft. Secured to the shaft is a disk 256, having a projection 257 fastened to it, as shown in Fig. 66. When the clutch-pin 253, which is held by the spring 258, is withdrawn out of contact with this projection 257, the cams on the sleeve will stop. All of the cams fastened to the shaft continue and make a revolution, returning the type-bars to the magazine. If the line is of correct length, or a shorter length, the pawl 249 will fall from the offset 245 and throw the lever out of the line of the clutch pin, so that the full operation is completed. When the bar 242 is returned to the normal position, the pawl is raised by the cam 246 acting on the point 249 of the lever. At the starting of the operation, all the cams, including these on sleeve, are started, so that if the clutch is operated, the cams on the sleeve are left in the position about 90 degrees ahead of their normal position. On the next line being formed and the bar to be indented, the cams on the sleeve are carried around from the advanced position by the projectors 257 impinging on the clutch pin.

*Starting and stopping mechanism.* (Figs.

69, 70 and 71.)—260 is a friction-clutch and driving pulley (Fig. 2) operated through sliding-sleeve 261. When the sleeve is forced toward the clutch, the friction will be relieved, and the machine will stop. A lever 262 bears against the sleeve 261. It is drawn against an adjustable stop screw 263 in the lever 265 fulcrumed at 266 by spring 264. A sliding pin, 267 (Fig. 71) pressed by spring 268, is in the line of the projection 269 on the lever 265. At the completion of a line, or a complete revolution of the cam shaft, the sliding pin will strike this projection and, through the lever 262, stop the machine by releasing the friction-clutch. To start the machine, the lever 270 is pushed to the right. An adjustable stop, 271, in the lever impinges on the sliding-pin 267, and pushes it out of contact with the lever 265, which permits the machine to start. An emergency device for stopping or starting the machine at any time, is operated through handle 272, which, when moved to the right, will, through the bars 273 and 274, throw the sleeve to the left and stop the machine.

*Modified keyboard.*—This is shown in Figs. 73 to 75. All similar parts are given the same reference numerals or letters as on the keyboard hereinbefore described. Lever 10 has at its upper end a pawl 300 forced upward by spring 301, and a stop 302. 303 is a latch-bar on which the pawl 300, latches when a finger key is depressed, and while the ratchet shaft 12, lifts the pawl 15, operating the keyboard mechanism before described. During this operation the end 28 of pawl 15, acts on the cam shaped bar 24, and draws it toward the left. Attached to the cam shaped bar is an extension 304 with a cam 305. Fulcrumed at 306 is a plate 307 extending across the keyboard and held against a stop 308 by a spring 309. Mounted on the lower projection of the plate 307 is a pawl 310 held by a spring 311 against a stop 312. When the lifting of the pawl 15 is completed, the end 28 passes over the cam of bar 24, which allows the bar 24, by its spring 27, to take the position shown in Fig. 74. This motion of the bar 24 operates through cam 305, acting on pawl 310, to lower the plate 307, thereby releasing pawl 300 from the latch bar 303, as shown in Fig. 74, allowing the lever 10 to return to its normal position by spring 10ᵃ. A spring 313, with a stop 314, is attached to lever 10 against which the upper ends of the key levers bear, the object of which is to serve as a cushion. The key levers are provided with a stop bar 315.

Having thus described in detail a machine embodying my inventions in the forms at present preferred by me, what I claim is:

1. A type bar composed of a series of bars, each bearing a plurality of types on its edge of uniform width, and flexible connections between the bars, said type bar containing the number of characters employed in the machine.

2. A type bar composed of a series of bars each bearing a plurality of types on its face of uniform width, said bars being flexibly connected together, each type bar containing the number of characters used in the machine, and an automatic spacing device.

3. A type bar composed of a series of bars connected together by flexible connections, the characters on each bar being of uniform width and different bars in the series being of different widths corresponding to the widths of the characters.

4. A type bar composed of a series of bars connected together by flexible connections, each having a plurality of types of uniform width, different bars in the series being of different widths, said type bar carrying the entire number of the characters used in the machine.

5. A type bar composed of a series of bars, each flexibly connected and bearing a plurality of types on its edge, the type on each bar being of uniform width and the different bars being of different widths with means for assembling said bars in line to form a line of type, and means for justifying said line.

6. A type-bar composed of a series of bars, each bearing a plurality of types on its edge, the type on each bar being of uniform width, and the different bars being of different widths, and flexible connections between them.

7. A series of type bars each composed of a series of bars bearing a plurality of types of uniform width, different bars in each series being of different widths and flexible connections between them.

8. In a typographic machine the combination of a series of type bars each composed of connected sections, the types on each section being of uniform width and different sections of different width, with a series of bands attached to said bars and means connected to said bands for assembling said bars side by side to form a line of type.

9. In a typographic machine the combination of a series of type bars, each composed of connected sections, the types on each section being of uniform width and different sections being of different widths, with a series of bands attached to said bars and means connected to said bands for assembling said bars in line to form a line of types, and automatic means for justifying such line.

10. The combination of a type bar composed of a series of bars, each bearing a plurality of types on its edge of uniform width and flexible connections between the bars, with a band attached to each bar, and means connected with said band for releasing said bar and for arresting it.

11. In a typographic machine the combination of a keyboard, a series of type bars, a series of bands connected to said bars and means connected to said bands for releasing and arresting said bars in succession by operation of keys on the keyboard, and means for returning said type bars to their original position.

12. In a typographic machine, the combination of a keyboard with a series of type bars, each connected to a band a stop connected to said band, automatic means connected with said keyboard for releasing and arresting said bars in succession to form a line of type by means of said stop, and automatic means for returning said bars to their original position.

13. In a typographic machine, the combination of a keyboard, a magazine, a series of type bars, a series of bands attached to said bars, stops attached to said bands automatic means connected with said keyboard for releasing said type bars successively from said magazine, means for arresting said bars as released to form a line of type, and automatic means for returning said type bars collectively to their original position.

14. In a typographic machine the combination of a type bar, a band, means for holding said band in position, and means for detaching said bar from said band consisting of a detachable hook connection.

15. In a typographic machine, a series of type bars, a series of bands connected to said bars by hooks, stops or heads attached to said bands, and means for holding said bands in position by said stops when detached from said bars.

16. In a typographic machine, the combination of a series of type bars a series of bands attached to said bars, heads or stops attached to said bands, a keyboard, means for releasing said bars in succession by the operation of keys on the keyboard, means for assembling said bars in line as released to form a line of type, means for taking an impression from said type, and means for returning said type bars collectively to their original position.

17. In a typographic machine the combination of the following elements: A keyboard, a series of type-bars attached to a series of flexible bands and arranged to drop vertically to the left of the key-board; a quadrant or guide over which said bands pass above the key-board, heads attached to said bands and horizontal guides in which said heads move transversely to the machine.

18. In a typographic machine the combination of a key-board, a magazine; a series of bands attached to type-bars at one end and to heads at the other, means for securing the said bands in the said magazine by said heads means controlled by said keyboard for releasing said bands successively from said magazine and means for assembling said bars as released to form a line of types.

19. In a typographic machine the combination of a key-board; a series of type-bar bands arranged transversely to the machine; a series of stop bars set in a reciprocating frame; means controlled by said key-board for causing each of said stop bars to descend independently into the path of said bands and means for causing said frame to descend step by step.

20. In a typographic machine the combination of a key-board; a frame carrying a series of stop bars, a magazine containing a series of bands, heads attached to said bands; means controlled by the operation of the keys in the keyboard for causing the said frame to descend step by step; and means for releasing said bands in succession by the movement of said frame.

21. In a typographic machine the combination of a key-board; a magazine; a stop-frame carrying a series of stops; a series of type-bar bands; means controlled by the keys on said key-board for positioning each of said stops independently two steps in advance of said frame; means for causing said frame to advance one step at each operation; means for releasing each of said bands in succession; means for arresting each of said bands by the stop selected, and means for returning all of said bands to their original position in the magazine.

22. In a typographic machine, the combination of a series of type bars, a series of bands connected to said bars, heads attached to said bands, a series of stop bars, a keyboard, and means connected with said keyboard for releasing said type bars in succession and arresting them by said stop bars.

23. In a typographic machine the combination of a key-board, a series of bands a series of type bars connected to the bands, heads attached to said bands, guides or grooves for said heads, a series of stop bars, means connected with said key-board for setting said stop bars, and means for releasing said bars in succession and arresting them by said heads.

24. In a typographic machine the combination of a key-board, a series of type bars, a series of stop bars set in a movable frame, and means controlled by said key-board for setting said stop bars and releasing said type bars by the movement of said frame to form a line of selected type.

25. In a typographic machine, the combination of a keyboard, a series of type bars, a series of stop bars set in a reciprocating frame, and means connected with said keyboard for setting said stop bars, moving said frame and releasing said type bars by the movement of said frame and arresting them by said stop bars.

26. In a typographic machine, the combination of a series of type bars, a series of ratchets set in a reciprocating frame, a keyboard, and means controlled by keys on said keyboard for setting said ratchets to form stops for said type bars.

27. In a typographic machine, the combination of a keyboard, a series of type bars, a series of ratchets set in a reciprocating frame, means connected with said keyboard for setting said ratchets, and means for releasing said type bars in succession to form a line of type.

28. In a typographic machine, the combination of a keyboard, a series of type bars, a series of ratchets set in a reciprocating frame, and means controlled by said keyboard for setting said ratchets, means for moving said frame and releasing said type bars in succession and arresting said bars by said ratchets to form a line of type.

In testimony whereof I have signed my name to this specification in the presence of two subscribing witnesses.

BYRON A. BROOKS.

Witnesses:
W. A. PAULING.
R. B. CAVANAGH.